United States Patent
Jalon

(10) Patent No.: US 7,966,428 B2
(45) Date of Patent: Jun. 21, 2011

(54) CONTROL OF ELECTRONIC DEVICES BASED ON CAPABILITY DESCRIPTIONS

(75) Inventor: Julien Jacques Jalon, Paris (FR)

(73) Assignee: Apple Inc., Cupertino, CA (US)

( * ) Notice: Subject to any disclaimer, the term of this patent is extended or adjusted under 35 U.S.C. 154(b) by 1230 days.

(21) Appl. No.: 11/591,300

(22) Filed: Oct. 31, 2006

(65) Prior Publication Data

US 2008/0102821 A1    May 1, 2008

(51) Int. Cl.
*H04W 24/00* (2009.01)
*G06F 7/00* (2006.01)
*G06F 17/30* (2006.01)
*G06F 3/00* (2006.01)
*G06F 9/44* (2006.01)

(52) U.S. Cl. ............ 710/8; 455/425; 707/736; 707/737; 707/738; 707/791; 707/797; 707/803; 719/321; 719/327

(58) Field of Classification Search .................. 455/403, 455/422.1, 423, 425; 707/705, 736–738, 707/790, 791, 797, 798, 802, 803; 710/1, 8; 719/321, 324, 327

See application file for complete search history.

(56) References Cited

U.S. PATENT DOCUMENTS 6,574,678 B1 *  6/2003  Nykanen et al. ................ 710/10

* cited by examiner

*Primary Examiner* — Alford W Kindred
*Assistant Examiner* — Richard B Franklin
(74) *Attorney, Agent, or Firm* — Blakely, Sokoloff, Taylor & Zafman LLP

(57) ABSTRACT

Methods, systems, apparatuses, and computer readable media for controlling one or more electronic devices are described. According to one described aspect, an embodiment of a method includes providing a plurality of schemes, each scheme defining features that are operable on an electronic device and which features each of the features in the scheme can use, and receiving data for identifying the type of the electronic device, and selecting, based on the type, one of the schemes, and controlling the electronic device based on the selected scheme.

19 Claims, 7 Drawing Sheets

CONTROL OF ELECTRONIC DEVICES BASED ON CAPABILITY DESCRIPTIONS

FIELD OF THE INVENTION

The present invention relates to the describing of the capabilities and functions of electronic devices such as mobile telephones and personal assistants (PDAs), and their control by, for example, applications on a user's computer.

BACKGROUND OF THE INVENTION

Mobile devices such as mobile telephones and PDAs are commonly arranged to perform communication with a user's computer. For example, a user may wish to use connect his mobile phone and his computer to download pictures taken with the phone to the camera or to upload pictures stored on the computer to the phone; to update or synchronise contact details; to cause the mobile phone to act as a modem for the computer; to allow the computer to send short messaging service (SMS) messages via the phone; to manage files on the phone and so forth. Increasingly, mobile phones also have loaded on them calendar, address book and synchronising software such as MS (MICROSOFT™) OUTLOOK™ and Apple ICAL™ and ISYNC™.

When a purchaser buys a new mobile phone, typically the user is provided with a CD-ROM on which the required software to perform the required communications operations between the mobile phone and the computer are stored. The user loads the data on the CD-ROM onto the computer, which then allows necessary control and operation of, and interfacing with, the mobile phone.

Currently, there is a large number of different makes and models of mobile phones on the market, each having various features (that is, capabilities and functions) at various different layers to allow it to communicate with a computer. These layers can include application, protocol and transport layers, amongst others. The list of features that a phone supports changes from manufacturer to manufacturer, series to series and even model to model. For example, one model in a series issued by a manufacturer may have the features of personal data synchronisation, network connection, SMS sending and file management, whereas another model in the same series may have network connection, SMS sending and file management, but not personal data synchronisation. Conversely, one model may be provided with USB and BLUETOOTH™ connectivity, while another model may be provided with USB and infrared (IR) connectivity.

Thus, even when two phones have the same top-level features, the way in which they are implemented is often very different, with different limitations and using different standards (or features) at lower levels. For correct operation of the mobile phone, these different standards (which can themselves be considered as different lower-level features) must be correctly implemented.

To control communications between a computer and a mobile phone, phone manufacturers generally allow the computer operating system (OS) to handle lower level aspects, such as BLUETOOTH™ and USB, while reserving higher level aspects to themselves. Accordingly, the CD-ROM provided by the manufacturer is a complete on-computer application for manipulating the phone. This application allocates certain aspects of communication between the computer and the phone to the computer OS and controls other aspects of the communication. The aspects allocated to the computer OS change between different models of mobile phones, depending on their design.

Similar considerations apply to PDAs and other electronic devices.

SUMMARY OF THE INVENTION

Presently, there are no generic mobile phone or other electronic device drivers that allow the computer OS or third party applications to handle one or more features of all capable phones without writing specific code for many different phones. The present invention is intended to address this situation.

According to a first aspect of the present invention, there is provided a method of describing the features of at least one of a plurality of electronic devices, the method comprising:
  defining a plurality of features, which may be operable on one or more of the plurality of electronic devices;
  setting a scheme for the at least one electronic device, the setting step comprising:
    determining which of said plurality of features is operable on the at least one device; and
    establishing which other features each of the determined features can use during operation of the at least one device.

Preferably, each of the features is a service that is operable on one or more of the plurality of devices and, more preferably, each of the features is assigned a level of a hierarchy. Each feature in one level of the hierarchy can use one or more features at the next lower level of the hierarchy and can be used by one or more features at the next highest level of the hierarchy.

According to another aspect of the present invention, there is provided a method of controlling at least one of a plurality of electronic devices, the method comprising:
  defining a plurality of features, which may be operable on one or more of the plurality of electronic devices;
  determining which of said plurality of features is operable on the at least one device;
  establishing interoperability of the determined features, by establishing which other features each of the determined features can use during operation of the at least one device; and
  controlling the at least one electronic device based on the determined features and the established interoperability.

According to a further aspect of the invention, there is provided a method of controlling an electronic device, the method comprising:
  providing a plurality of schemes, each scheme defining for at least one electronic device the features operable on the at least one electronic device and which features each of the features in the scheme can use;
  receiving data for identifying the type of the electronic device;
  based on the type of the electronic device, selecting a predetermined one of the plurality of schemes; and
  controlling the electronic device based on the selected scheme.

Preferably, the electronic device is controlled using an object oriented program, each feature in the selected scheme corresponding to an object instance of the object oriented program.

More preferably, the device is controlled using an interface created by: determining the features of the device required to implement a desired control; mapping each of the required features with an object instance based on the selected scheme; and implementing the object oriented program, wherein the desired control is carried by invoking methods of the mapped object instances in the selected scheme.

In other aspects, there are provided a computer system, a computer program and a computer-readable program product.

Thus, the present invention provides an extensible way for phone manufacturers and third parties to describe the various capabilities of different mobile phones or other electronic devices, from the lowest level to the highest level, in a generic way. This description can be used by an application on a computer, as or in a driver or plug-in, to understand whether a particular feature is supported by a mobile phone and, if it is, how that feature is used. It is preferred that the descriptions of the phones' capabilities are platform independent and can therefore be used on a number of different platforms, such MAC™ OS and MS (MICROSOFT™) WINDOWS™ platforms.

BRIEF DESCRIPTION OF THE DRAWINGS

Embodiments of the present invention will now be described by way of further example only and with reference to the accompanying drawings, in which.

DETAILED DESCRIPTION

The present invention involves providing a complete description of the feature set of an electronic device. Hereinafter, the detailed description will be given with reference to (a) mobile phone(s). However, it should be understood that the present invention is also applicable to all other kinds of electronic device, including PDAs, monitors, portable music players, and even computer mouses.

Figure 7:
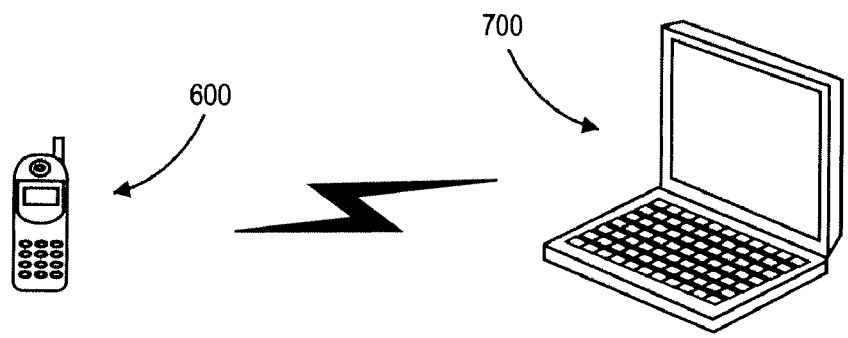
FIG. 7 is a schematic representation of a computer system comprising a laptop computer connected over BLUETOOTH™ to a mobile phone.

FIG. 7 shows a laptop computer 700 wirelessly connected to a mobile phone 600 using the BLUETOOTH™ standard by means of an appropriate interface on each of the computer and the phone. The computer 700 has loaded on it an operating system (OS) and various applications running on the OS, which may communicate with the phone 600 to swap various data. Similarly, the phone 600 may have loaded on it various applications for communicating with the computer 700.

The computer 700 includes a storage area on which the applications are stored and may additionally include a CD-ROM drive (not shown) or other memory drive, to enable it to read programs stored on a CD-ROM (not shown) or other memory device.

Moreover, the phone 600 and the computer 700 may be connected in other ways, using other interfaces, including by a physical cable, using infrared and using wireless Internet.

The phone 600 has a plurality of features, including its communications capabilities and the other functions it is able to perform. The description of the feature set of the mobile phone 600 can be considered as a graph or scheme of services. It should be understood that although the present invention is described in terms of service graphs, a graph need not be prepared for implementation of the present invention.

Each service in the graph/scheme describes a specific feature of the phone and has a type (the "feature") and properties (properties of the feature). Many services rely on other services, which are generally provided as lower level services. The reliance of each service on another service is included in the scheme and can therefore be shown in the graph.

In a preferred embodiment, service names are dot separated strings, like domain-names. This is useful where an application on the computer 700 is in an object oriented programming language and uses the scheme to implement control of, or perform tasks in conjunction with, the phone 600. Some service names are reserved to name services that the application might want to use directly. These are generally high level services. As an example, the service "public.synchronisation", if present in the scheme, is known to provide the feature of synchronising personal data between the phone and the computer and "public.filemanager" is known to provide for file management on the phone.

As will be discussed in more detail below, it is preferred that the present invention implements control of the phone using object oriented programming. The name format discussed above is convenient for mapping services in the scheme to object instances in the object oriented program. In that case, the prefix "public" in these names indicates that the service is a publicly available service, which might be accessed or used directly by an application on the computer, rather than a private service whose operation is particular to a manufacturer of the mobile phone. However, the naming format discussed above and the use of object oriented programming are not mandatory and any suitable format and method of implementation may be used.

In addition to a name, each service has a service type and service properties. Service types describe the respective features. For example, the service name "public.synchronisation" may have the service type "data synchronisation". Service types can be further refined to better describe the service. Thus, the service type "data synchronisation" can be refined to "SyncML data synchronisation" or "IRMC data synchronisation".

SyncML is a standard for synchronizing personal organizer data between different devices. Such data includes contacts, to-do lists, and schedules. Devices might be phones, handhelds and PCs. SyncML provides an XML-based standard format for this data, that all SyncML-compatible devices can understand. It can work over various types of connection, including Wireless Internet, BLUETOOTH™, and infrared. IrMC is an alternative protocol with which personal information can be synchronised between devices. It can also work over various types of connection.

Examples of service types include:
bus service: provides a generic service describing a bus to connect a phone;
BLUETOOTH™ bus service type: refines "bus service type";
channel service type: provides a data stream between the computer and the phone (for example a BLUETOOTH™ RFCOMM channel);

protocol service type: provides some middle level protocol relying on a channel;

Obex protocol service type: refines "protocol service type" and provides an object exchange (ObEx) message-based session;

AT protocol service type: refines "protocol service type" and provides an AT-based modem session;

Channel lock service type: a simple service that arbitrates the usage of two more channel services.

Service properties describe the specific set of properties for each service. The properties can be used to define the limitations of the phone, such as the maximum permissible length of file names in a file manager service, as well as the names of other services that service will rely on. For example, a protocol service may have a transport service property, which points to one or more channel services to be used by that protocol service.

Figure 1:
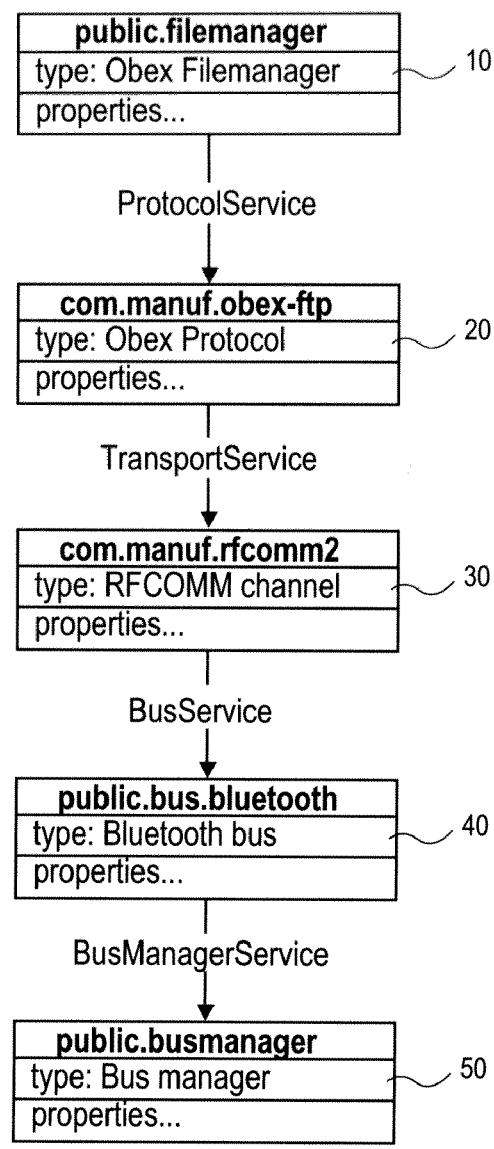
FIG. 1 is a graph representing a service scheme for driving a mobile phone supporting file transfer using standard Obex-FTP over BLUETOOTH™.

An example of a service graph is shown in FIG. 1. This service graph represents the features needed to drive a phone supporting file transfer using standard Obex-FTP over BLUETOOTH™. Thus, the service graph includes the features required to perform file transfer from a computer to a particular mobile phone (or class of mobile phones) or vice versa, using a standard Obex file transfer program (FTP) over BLUETOOTH™. The top level service, which will be used directly by an application on the computer, is the "public.filemanager" service 10. The service type is "Obex Filemanager" indicating that the file manager service is to be performed using the Obex protocol. The protocol service property of the "public.filemanager" service 10 points towards the "com.manuf.obex-ftp" service 20. Note that the prefix "com.manuf" points to the service being specific to the manufacturer.

The naming of services can use any appropriate convention. Using a "reverse domain name" convention helps avoid any conflict in the names of services. As described above, "public.xxx" is likely to be reserved for names of services that an application on the computer might want to use. For example, in this embodiment, if an application wants to perform personal information management (PIM) synchronization with a phone or other device, it will access the "public.synchronization" service, whatever the phone or device it has to handle.

Other services that might only help "public" services to work and that the application might not use or access directly are named in this convention so that they include the reverse of the manufacturer's domain name. For example if the domain name of the phone manufacturer NOKIA™ is "nokia.com", every specific NOKIA™ service is named "com.nokia.xxx". In this embodiment, for convenience the term "manuf" is used instead of a specific manufacturer's name. As stressed above, other naming conventions are appropriate and reference to specific manufacturers is not necessary.

As would be expected, the "com.manuf.obex-ftp" service 20 has the Obex protocol service type. The "com.manuf.obex-ftp" service 20 also has a transport service property pointing towards the "com.manuf.rfcomm2" channel service.

The "com.manuf.rfcomm2" channel service has the refined service type of being an RFCOMM channel service. The "com.manuf.rfcomm2" channel service has a bus service property pointing towards the "public.bus.bluetooth" service 40.

In turn, the refined service type of the "public.bus.bluetooth" service 40 is a BLUETOOTH™ bus service. It has a bus manager service property defining the "public.bus.bluetooth" service 40 as using the "public.busmanager" service 50, which has its own service type and properties.

Accordingly, the service graph shows that the phone supports file transfer using the various features included in the service graph. Given the knowledge of the scheme represented by the service graph shown in FIG. 1, if a computer application wished to manage the files on a mobile phone, it would simply need to know to call up the "public.filemanager" service 10, which would then direct itself, the computer application or the OS to each of the other services required to operate the file manager feature of the application.

Figure 2:
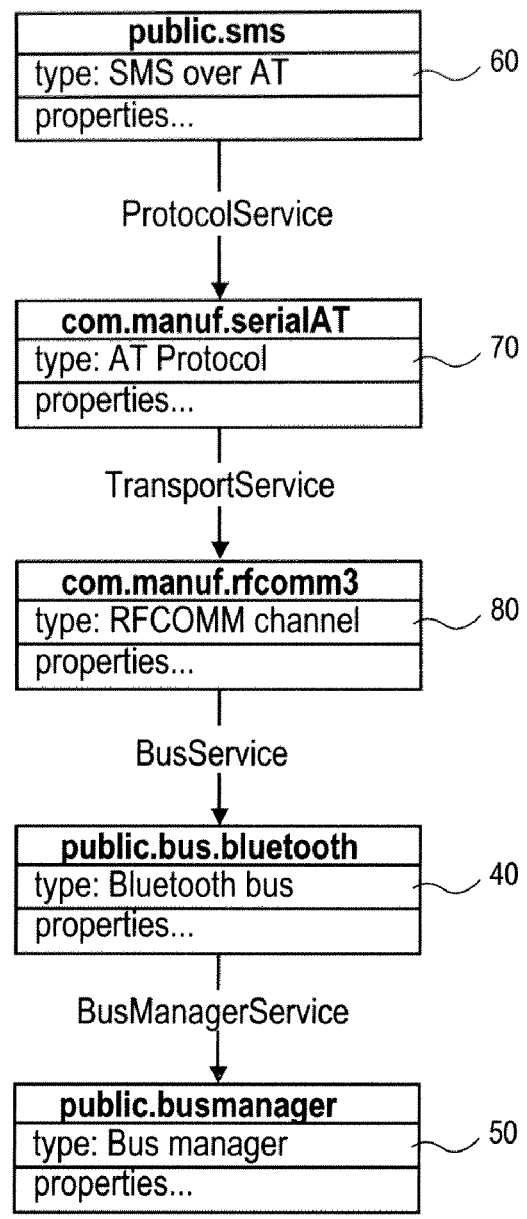
FIG. 2 is a service graph for driving a mobile phone supporting SMS sending using standard (Hayes) AT commands over BLUETOOTH™.

FIG. 2 shows the service graph for the features required to drive a phone to supporting SMS sending using standard (Hayes) AT commands over BLUETOOTH™. The top level service, which will be used directly by the application on the computer, is the "public.sms" service 60. The service type is refined as "SMS over AT" and the service is a public service. The protocol service property of the SMS service points towards the "com.manuf.serialAT" protocol service.

As would be expected, the "com.manuf.serialAT" service 70 has the AT protocol service type. The "com.manuf.serialAT" service 70 also has a transport service property pointing towards the "com.manuf.rfcomm3" channel service 80.

The "com.manuf.rfcomm3" channel service 80 has the refined service type of being an RFCOMM channel service. The "com.manuf.rfcomm3," channel service 80 also has a bus service property pointing towards the "public.bus.bluetooth" service 40.

Again, the refined service type of the "public.bus.bluetooth" service 40 is a BLUETOOTH™ bus service. It has a bus manager service property defining the "public.bus.bluetooth" service 40 as using the "public.busmanager" service 50, which has its own service type and properties.

Accordingly, given the knowledge of the scheme represented by the service graph shown in FIG. 2, if a computer application wished to send an SMS message via a mobile phone, it would simply need to know to call up the "public.sms" service 60, which would then direct, itself, the computer application or the OS to each of the other services required to operate the file manager feature of the application.

Figure 3:
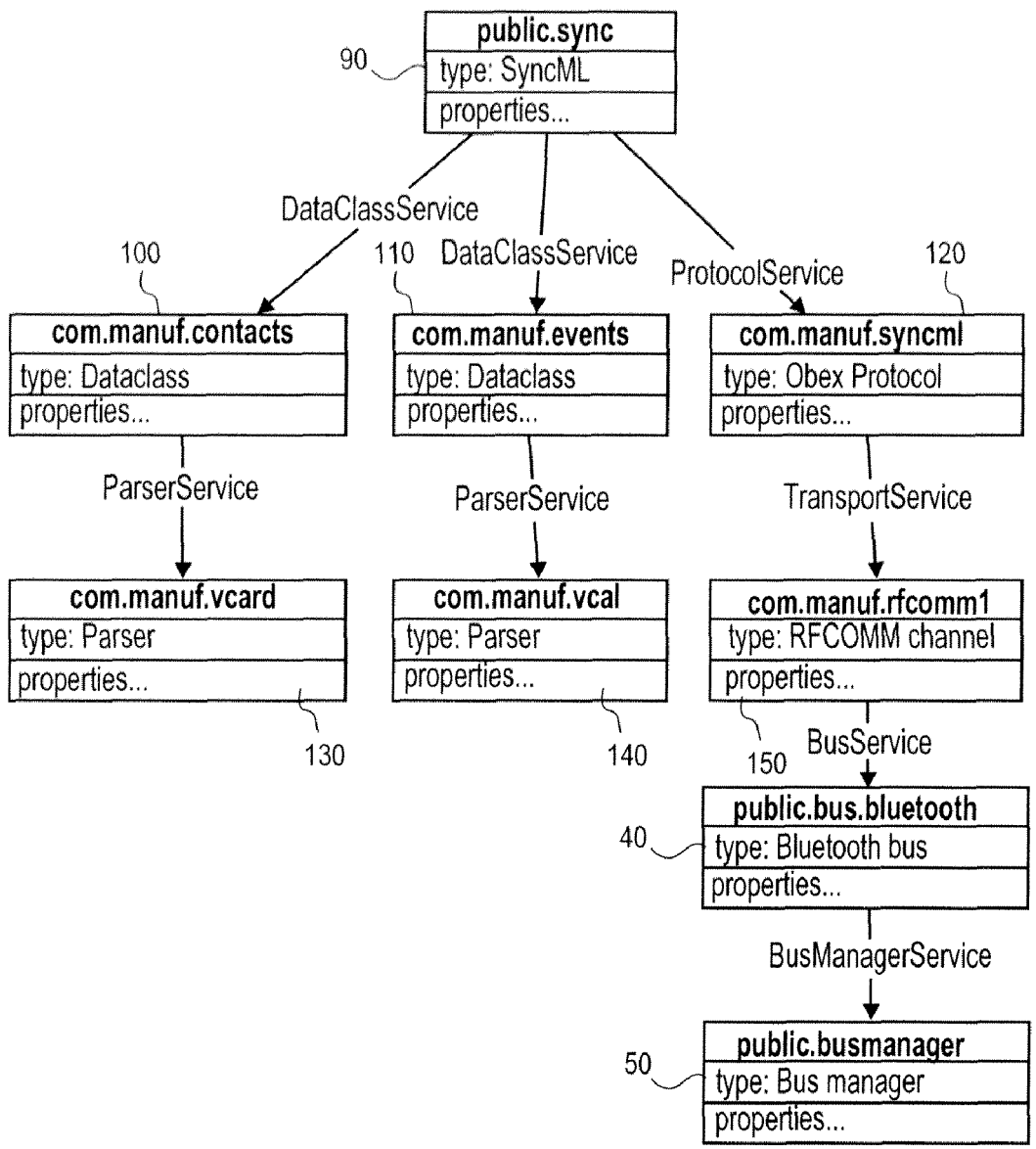
FIG. 3 is a service graph for driving a mobile phone supporting PIM synchronisation using standard SyncML over BLUETOOTH™.

FIG. 3 is a more complex graph showing a service scheme for driving a phone supporting personal information management (PIM) synchronisation using the standard SyncML protocol over BLUETOOTH™.

In this case, the top level service is the "public.sync" service 90. The service type is refined "SyncML" and again the service is a public service. In this case, however, the top-level service has a protocol service property, which points towards the "com.manuf.syncml" service 120, as well as two data class service properties. The first data class service property points to the "com.manuf.contacts" service 100, whereas the second data class points to the "com.manuf.events" service 110. When the personal information relates to contacts, the "public.sync" service 90 will use the "com.manuf.contacts" service 100, and when it relates to events in a calendar, the "public.sync" service 90 will use the "com.manuf.events" service 110. In either case, it will use the allocated protocol service to pass objects (contacts/events) between the computer and the phone.

The "com.manuf.contacts" service 100 has the service type "Dataclass" and has a parser service property pointing to the "com.manuf.vcard" service 130, which naturally is a parser service.

The "com.manuf.events" service 110 also has the service type "Dataclass". By contrast, however, it uses the "com.manuf.vcal" parser service 140.

The "com.manuf.syncml" protocol service is an Obex protocol service, which is suited to exchanging objects such as items of personal information between devices. Its service properties include a transport service property pointing towards the "com.manuf.rfcomm1" service 150. As with the "com.manuf.rfcomm2" and "com.manuf.rfcomm3" services discussed above, the "com.manuf.rfcomm1" service 150 uses a BLUETOOTH™ bus service, which in turn uses a bus manager service.

Accordingly, given the knowledge of the scheme represented by the service graph shown in FIG. 3, if a computer application wished to pass PIM data between itself and a mobile phone, it would simply need to know to call up the "public.sync" service 90, which would then direct itself, or in less object oriented implementations the computer application or the OS to each of the other services required to pass PIM information, be it calendar or contact information.

Figure 4:
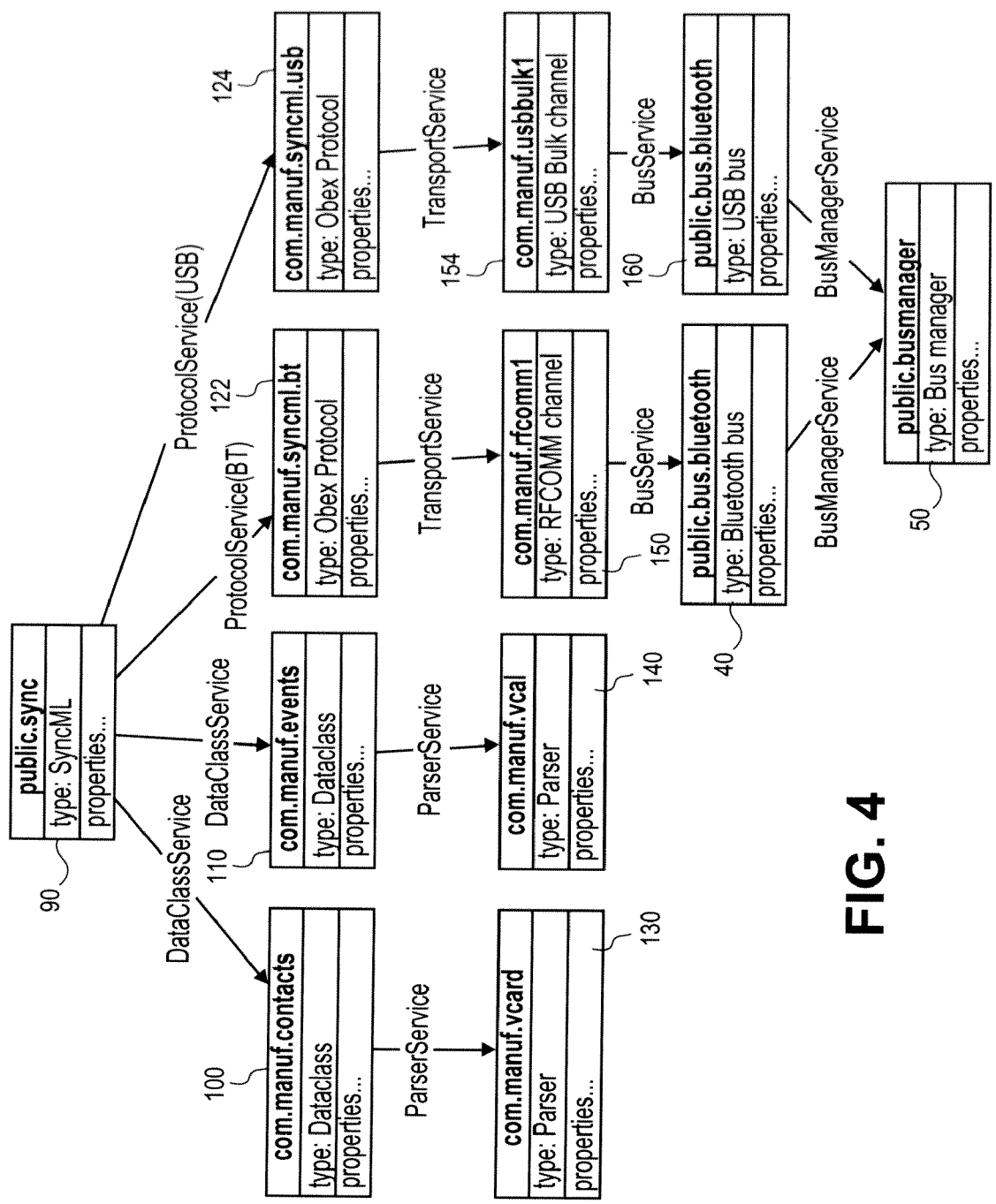
FIG. 4 is a service graph for driving a mobile phone supporting PIM synchronisation using standard SyncML over BLUETOOTH™ and USB.

In the example shown in FIG. 3, PIM synchronisation is carried out over a BLUETOOTH™ bus. However, it may be possible to carry synchronisation using a USB bus instead. Alternatively, it may be possible to carry out synchronisation using either BLUETOOTH™ or a USB plug. FIG. 4 shows an implementation where this option is provided.

In FIG. 4, the "public.sync" service 90 can use the "com.manuf.contacts" and "com.manuf.events" services, as in FIG. 3. However, its protocol service properties include the use of both a BLUETOOTH™ (BT) protocol service and a USB protocol service. Specifically, the "public.sync" service 90 has protocol properties pointing both to a "com.manuf.syncml.bt" service and a "com.manuf.syncml.usb" service. Both of these services are Obex protocol-type services.

The "com.manuf.syncml.bt" service uses the "com.manuf.rfcomm1" service 150 discussed above, which in turn uses the "public.bus.bluetooth" and "public.busmanager" services discussed above. In contrast, the "com.manuf.syncml.usb" service uses the "com.manuf.usbbulk1" service 154, which is refined as a USB Bulk Channel service and has a bus service property pointing towards the "public.bus.usb" service 160, which is a USB-type bus. It should be noted that both the "public.bus.bluetooth" and "public.bus.usb" services use the same bus manager service.

The decision on which protocol service to use is made by the bus manager service at run-time, depending on which buses are available at the time and, if both are available, which is faster or otherwise more appropriate.

It is noted that in each of FIGS. 1 to 4, the services at the top of the scheme could be commonly used by non-phone specific computer applications, such as Apple ICAL™ and MS (MICROSOFT™) OUTLOOK™. Similarly, the services at the bottom of the scheme are services which are commonly devolved to the computer in any case. The services in the middle tend to be manufacturer specific implementations of services that are required for successful communications between the computer application and individual makes and models of mobile phone.

Figure 5:
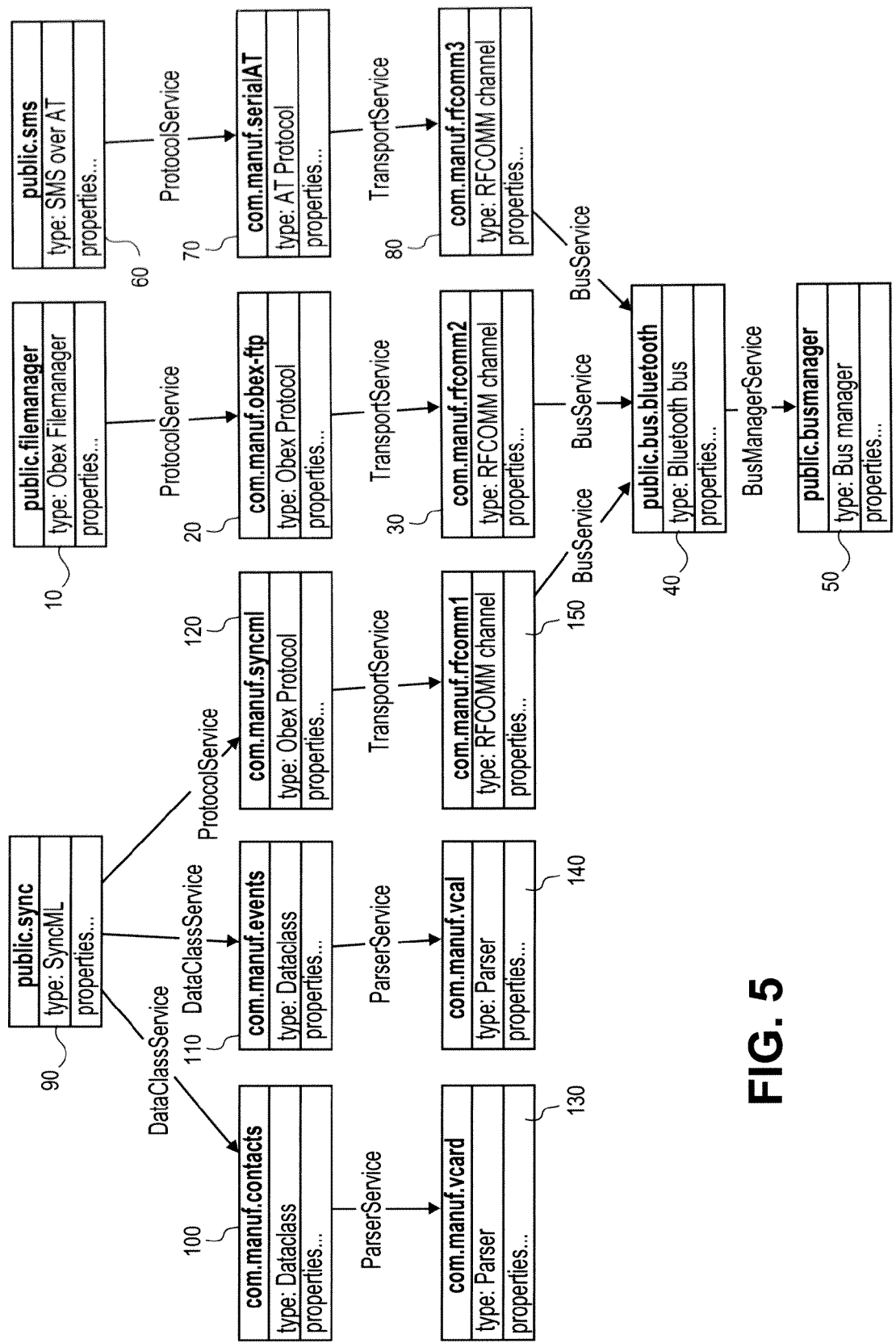
FIG. 5 is a service graph for driving a mobile phone supporting PIM synchronisation using standard SyncML, file transfer over Obex-FTP and SMS sending using AT commands, all over BLUETOOTH™.

It is further noted that an individual phone may be able to carry out each of file transfer, SMS messaging and PIM synchronisation services in conjunction with a computer. In that case, the service graph for that mobile phone could be a combination of the service graphs shown in FIGS. 1 to 3, as shown in FIG. 5. The scheme represented by the service graph in FIG. 5 simply inherits the schemes represented by the service graphs shown in FIGS. 1 to 3, including all the features in these graphs and their interoperability—that is, how some services use other services.

It is worth noting that in the scheme shown in FIG. 5 two of the services are Obex protocol type services, although one is a synchronisation service and the other is an FTP service and they use different transport channel services. However, all three transport channel services use the same BLUETOOTH™ public bus service, which in turn uses a common public bus manager service.

This could potentially lead to the problem that the device in theory has two different independent channels, which in practice cannot be accessed at the same time. To prevent this, both the "com.manuf.rfcomm1" 150 service and the "com.manuf.rfcomm2" service 30 in the scheme in FIG. 6 include an additional property pointing to the service "com.manuf.obexlock". This is a parser service, which each of the RFCOMM channel services must consult before invoking the "public.bus.bluetooth" service's methods. The "com.manuf.obexlock" service 160 determines whether another channel with Obex protocol is using a bus and, if it is, locks out the requesting service. In this way, only one Obex-based session can be transmitted on the BLUETOOTH™ bus at one time.

Figure 6:
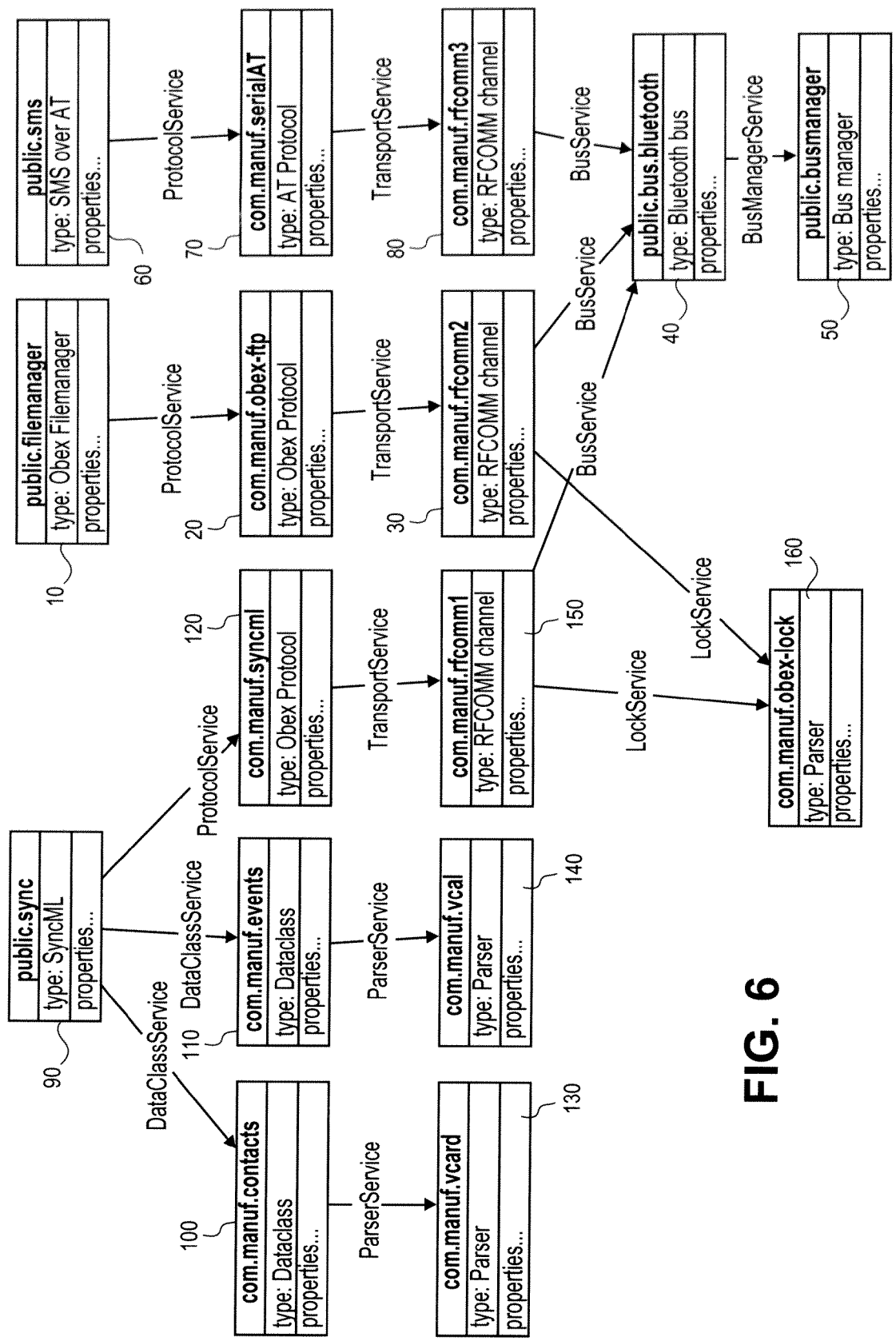
FIG. 6 is a service graph for driving a mobile phone similar to FIG. 5, but including an additional lock service.

In summary then, FIG. 6 shows a service graph representing a scheme of features possessed by a mobile phone. The graph shows that the phone supports SyncML data synchronisation over Obex over RFCOMM and personal information data using VCard and VCal as their formats. The phone also supports file management over Obex over RFCOMM and SMS sending/receiving using the standard AT+CGMS commands and other Hayes commands. As discussed above, the channels for file management and data synchronisation rely on a common lock service so that only one of these two features can be used at any one time.

From the foregoing, it will be apparent that manufacturers or third parties can provide service schemes for computer operating systems applications, which can be used as a driver for the phone. An application on the computer can then determine whether a phone supports a feature that the application may wish to use and, if so, how.

For example, a "send SMS" application will only have to grab the branches of the graph it is interested in, starting with the "public.sms" service 60. If the phone's service graph provides that service and the application supports all the service types in the branch, the application will be able to use the phone to send an SMS message. In the case of the phone having the scheme represented in FIG. 6, the "public.sms" is provided and the application will be able to use the phone to send SMS messages from the computer. Moreover, the application can ignore the branches relating to the "public.sync" and "public.filemanager" services in FIG. 6 when sending SMS messages.

It should be noted that service types and standard names can be extended to provide new types and features of services. For example, an already defined type of service can be refined, in the way discussed above. Similarly, the features/properties of a service can be redefined, reduced or added to. Moreover, an individual phone's service graph can be extended by providing a new branch to describe support for new features.

In a preferred embodiment, the application provided on the computer is an object oriented program (OOP) and the application uses the service scheme for a phone by mapping service types to object instances. Each service type provides a class of objects and each individual service is an object instance of that class. Thus, each object instance provides specific methods depending on the service type it represents. For example, the object instances of each of the channel services (such as the "com.manuf.rfcomm1", "com.manuf.rfcomm2" and "com.manuf.rfcomm3" channel services) provide openStream( ), getStream( ) and closeStream( ) methods.

A complete interface to control a phone can be creating by bootstrapping the phone. This involves taking the service scheme of the phone and the features the host application might want to use and producing a dictionary, which maps service names to service object instances, following the relationships between the services in the scheme.

A typical command in an OOP might be:

phone_interface=bootstrap_phone(phone_service_graph, phone_id, "public.sms")

The interface is created by determining the identification of the phone, determining the phone service graph for that phone and determining the services required to send/receive an SMS message using the phone. In that case, using the service graph shown in FIG. 6, the phone interface contains all the services in the branch containing the "public.sms" service 60, as follows:

public.sms which is an object instance of the class
ATSMSService (SMS
over AT service type)
com.manuf.serialAT which is an object instance of the class ATProtocolService
(AT Protocol service type)
com.manuf.rfcomm3 which is an object instance of the class
RFCOMMChannelService
public.bus.bluetooth which is an object instance of the class BluetoothBusService
public.busmanager which is an object instance of the class BusManagerService Each of these object instances will include methods, which are invoked by the application or by other object instances. For example, the object instance "com.manuf.rfcomm3" 80 provides openStream( ),getStream( ) and closeStream( ) methods, which are invoked by the object instance "com.manuf.serialAT". In turn, the object instance "com.manuf.rfcomm3" 80 will invoke the methods provided by the "public.bus.bluetooth" service 40.

The host application will only need to use the service object instance with the name "public.sms" to send/receive SMS messages via the phone. This object instance, which provides an ATSMSService will, based on its properties, ask a service with the name "com.manuf.serialAT" to get an AT-based session, which will in turn ask a service with the name "com.manuf.rfcomm3" to get a stream, and so forth.

When seeking to send/receive an SMS message via the phone, the object instance may use the phone interface discussed above in the following manner:

phone_interface.serviceWithName("public.sms")
.sendSMS(recipients, message);

in which "phone_interface" is an object and "serviceWithName("public.sms")" is a command, which together provide a service. "sendSMS(recipients, message)" is a method of the "public.sms" ATSMSService.

The implementation of the ATSMSService's sendSMS( ) method might look like:

protocol_service_name=self.getProperty("Protocol.Service");
(in which "self" refers to the ATSMSService and getProperty ("Protocol.Service") provides the link to the next service, which is "com.manuf.serialAT")

phone_interface = self.getMyPhoneInterface( );
at_session = phone_interface.serviceWithName(protocol_service-name);
if(!at_session.startSession( )) {

-continued

```
    print "Can't use the AT session";
    return;
}
at_session.sendATCommand("AT+CMGS=" + recipients + "\r\n" + message);
at_session.endSession( );
```

It should be noted that in the foregoing example, the service type is mapped to an object instance, using an OOP language. In this case, the object classes, instances and methods are specific to the platform—that is, they are dependent on the host application and/or the computer's OS. However, the service types and the service scheme or graph are preferably generic in the sense that they are platform independent. This means that a single description of services (that is, a single service scheme/graph) can be provided for a particular phone and different platforms/applications can use that service description.

Moreover, the application on the computer or the OS can add generic services to the phone_interface, such as a service for persistency, so that the application/OS can store information about the phone on the computer.

Furthermore, the service scheme allows the OS to provide a lightweight system-wide server to arbitrate access to services. This server only needs to store the ID of the phone and the service names used by the respective client applications to perform arbitration and does not need to make assumptions about any client application's implementation. This is effectively an OS-wide implementation of the lock service concept discussed above. The server is a way to help two or more client applications access the same device. It makes sure each service for one particular device is only used once at any one time throughout the whole system. For example, if two SMS applications are running at the same time on the client, the server will make sure they do not attempt to send SMS at the exact same time.

Moreover, it is possible to update the service scheme of a mobile phone as the software on that mobile phone is updated. For example, if the phone is initially provided without the Apple ICAL™ application, this may subsequently be downloaded onto the phone. The service graph for that phone can then be updated and an ICAL™ application on the computer is able to synchronise with the ICAL™ application on the phone.

As discussed above, all models of phones are generally different and provide different features, both at a high and low level. However, all phones of a particular model will have the same service graph (at least before any software updates are performed by the user), and similar models will have similar service schemes/graphs. This is particularly the case where two different models of phone are made by the same manufacturer and belong to the same family of phones.

In view of this, it is expedient to create a metaclasses of service graphs in the present invention. Each metaclass describes parts of a service graph. Imagine that a mobile phone has the service graph shown in FIG. 5. This service graph is created from the metaclasses shown in FIGS. 1 to 3. Moreover, the service graph shown in FIG. 5 may itself act as a metaclass, which is used to create a service graph for another phone that has additional features. Thus, it is possible to create metaclasses using a simple multiple inheritance model, in which the service graphs of different metaclasses are merged.

In general, there are two types of metaclass: abstract metaclasses, which describe a family of phones (or parts of a family of phones), and concrete metaclasses, which describe a specific phone model. A service graph based on a concrete metaclass may itself be updated, for example if the software on an individual phone to which the service graph corresponds is updated.

Each metaclass has a unique identifier, preferably also using a dot based domain name-like notation. One example would be:

```
family name = "family.bluetooth-device";
    service name = "public.bus.bluetooth" type="Bluetooth bus"
[...]
``` which provides a metaclass for phones having a BLUETOOTH™ device.

A more complex example, which uses the above family metaclass, might be:

```
family name = "family.com.manufacturer.XYphones":
    inherits from "family.bluetooth-device"
    inherits from "family.sms-enabled-device
    service name="public.sms" type "SMS over AT"
        properties:
            ProtocolService → com.manuf.serialAT
        [...]
[...]
```

In this example, the metaclass entitled "family.com.manufacturer.XYphones" inherits services from the Bluetooth-device and sms-enabled device metaclasses and in addition includes the "public.sms" service 60 with a protocol service property pointing the object to the "com.manuf.serialAT" service 70.

A further example, which uses the metaclass "family.com.manufacturer.XYphones", might be:

```
model name = "com.manufacturer.XY2100":
    inherits from "family.com.manufacturer.XYphones"
```

From the foregoing, it should be clear that the XML format is a good way to describe metaclasses. Of course, other formats are also appropriate.

The metaclass for an individual phone model can be determined from a series of metaclasses stored by the application on the computer or by the computer's OS based on an identification of the phone. In particular, when a mobile phone is connected to a computer, its ID may be transmitted to the computer. The ID may be a Vendor ID, a product ID (especially for USB devices), a result for AT+GMM/GMI commands and so forth.

As an example, if a manufacturer's phone model XY2100b is connected to the computer, so long as this model is recognised by the application or computer's OS, the service scheme for that model can be obtained as follows:

```
model name ="com.manufacturer.XY2100":
    inherits from "family.com.manufacturer.XYphones"
    identification:
        public.gmi+gmm → ("manufacturer+XY2100",
        "Manufacturer+XY2100b")
```

Consequently, an application on a computer will be able to determine whether it is able to use a detected, unknown mobile phone to perform a particular task, so long as it is able to obtain at least some identification information for that phone. Using the list of all the metaclasses, the application will be able to identify the phone, determine whether it can use the phone to perform the task, and bootstrap it accordingly. For each step of the task, the appropriate branch of the service scheme is interrogated to work out the appropriate protocol service, the appropriate transport service and so on. Engines can be implemented piece by piece and service by service. Each service knows how to use its dependencies.

Thus, the application is able to provide a user interface (UI) for interaction with the user. When the user requests the application to perform a task, the application simply requests the appropriate service, with no knowledge of what features or capabilities the mobile phone has or of how services in the mobile phone are implemented. Rather, the requested (generally) top-level service provides the linkage necessary to select all appropriate additional services required to perform the task. In the event that the service scheme is stored by and operated on by the computer OS, the programming requirements for individual applications are minimal. Effectively, the application can request an appropriate top-level service and the OS will perform all the remaining tasks.

In the above description, the computer application includes a plurality of metaclasses (or individual service schemes for a plurality of phones) and obtains an identification of the phone. Based on the identification, the application constructs the service scheme from the metaclasses (or simply retrieves the correct service scheme for the identified phone). Alternatively, the phone may have stored on it its own service scheme.

From the foregoing, it will be clear to a person skilled in the art that the present invention provides a methodology by which the features and capabilities of any electronic device that interacts with another electronic device can be described. Moreover, the present invention provides a way in which the description of features and capabilities of a device can be used to perform tasks in conjunction with that device. The present invention also provides a way of providing a generic driver or plug-in by which an application on a first device can control or interact with any one of a plurality of second devices. Preferably, the application on the first device is implemented using an object oriented program and performs tasks in conjunction with the second device by mapping services (features and capabilities) in the description to object instances in the program.

Using the present invention, it is possible to abstractly describe a list of service types using an object oriented description. XML is a good candidate language since it makes it easy to add new service types, although of course the addition of service types is equally possible using other languages.

The service schemes for individual electronic devices may be produced by the manufacturers of the device and provided to third parties to enable them to write applications that are able to interact with the manufacturer's electronic devices. The service scheme may also be written by the third parties themselves. Manufacturers may even design electronic devices based on the generic structure used to describe the features of existing mobile devices, or based on existing metaclasses.

Moreover, manufacturers can test their devices to ensure that they meet the requirements of the description of its features and capabilities (service graph/scheme).

In addition, using the present invention, it is possible to provide an application for writing drivers for a plurality of mobile phones. In particular, this application can be very generic, providing a way to build complete service schemes using individual objects as services. These schemes may be complex, providing a description of all the services provided by a mobile phone, as well as a description of which other services each service uses. Alternatively, simple service schemes may be provided. The service scheme resulting from the driver writing application may be provided to the computer OS or the application on the computer, which is then able to communicate with the phone and perform tasks in conjunction with the phone.

In summary, the present invention provides a method of describing the capabilities of electronic devices, such as mobile phones. The present invention also provides a method for a computer application to interact with and/or control to control one or more of a plurality of electronic devices, based on their described capabilities. Moreover, the present invention provides a computer system comprising a computer and an electronic device connected together, the computer being able to interact with and/or control the electronic device, based on its described capabilities. In further aspects, the present invention provides a program to allow a computer to interact with and/or control of one or more of a plurality of devices, and a computer program product, such as a CD-ROM on which such a program is stored. In a yet further aspect, the present invention provides an electronic device having stored on it a description of its capabilities and functions. Other aspects of the present invention will be apparent from the foregoing description to those skilled in the art.

The foregoing description has been given by way of example only. However, it will be appreciated by a person skilled in the art that modifications can be made within the scope of the present invention.

What is claimed is:

1. A method of describing features of at least one of a plurality of electronic devices, the method comprising:
    defining a plurality of features, which may be operable on one or more of the plurality of electronic devices;
    setting a scheme for the at least one electronic device, the setting comprising determining which of said plurality of features is operable on the at least one device; and
    establishing which other features each of the determined features can use during operation of the at least one device,
    wherein each of the features is assigned a level of a hierarchy and each feature in one level of the hierarchy can use one or more features at the next lower level of the hierarchy and can be used by one or more features at the next highest level of the hierarchy.

2. A method according to claim 1, wherein a first level of the hierarchy relates to applications operable on one or more of the plurality of electronic devices.

3. A method according to claim 2, wherein the applications include at least one of messaging, synchronization and file manager services.

4. A method according to claim 1, wherein a second level of the hierarchy relates to at least one of data classes and protocols operable on one or more of the plurality of electronic devices.

5. A method according to claim 4, wherein the protocols include at least one of Obex and AT protocols.

6. A method according to claim 4, wherein the data classes include at least one of contacts and events.

7. A method according to claim 1, wherein a third level of the hierarchy relates to at least one of parsers and channels operable on one or more of the plurality of electronic devices.

8. A method according to claim 1, wherein a fourth level of the hierarchy relates to buses operable on one or more of the plurality of electronic devices.

9. A method according to claim 1, wherein a fifth level of the hierarchy relates to bus managers operable on one or more of the plurality of electronic devices.

10. A method of describing features of at least one of a plurality of electronic devices, the method comprising:
    defining a plurality of features, which may be operable on one or more of the plurality of electronic devices;
    setting a scheme for the at least one electronic device, the setting comprising determining which of said plurality of features is operable on the at least one device;
    establishing which other features each of the determined features can use during operation of the at least one device,
    wherein the plurality of features of the at least one electronic device are described as a graph linking each of the features operable on the device with one another based on how the features use each other.

11. A method of describing features of at least one of a plurality of electronic devices, the method comprising:
    defining a plurality of features, which may be operable on one or more of the plurality of electronic devices;
    setting a scheme for the at least one electronic device, the setting comprising determining which of said plurality of features is operable on the at least one device;
    establishing which other features each of the determined features can use during operation of the at least one device; and
    establishing at least one general scheme corresponding to at least two electronic devices by:
        determining which of said plurality of features is operable on both the at least two devices; and
        establishing which other features each of the determined features can use during operation of one of the at least two electronic devices;
    wherein the setting selects the general scheme and adjusts the selected scheme to correspond with the at least one device.

12. A method according to claim 11, further comprising:
    establishing a plurality of general schemes;
    wherein the setting selects at least two general schemes.

13. A method of controlling at least one of a plurality of electronic devices, the method comprising:
    defining a plurality of features, which may be operable on one or more of the plurality of electronic devices;
    determining which of said plurality of features is operable on the at least one device;
    establishing interoperability of the determined features, by establishing which other features each of the determined features can use during operation of the at least one device; and
    controlling the at least one electronic device based on the determined features and the established interoperability,
    wherein each of the features is assigned a level of a hierarchy and each feature in one level of the hierarchy can use one or more features at the next lower level of the hierarchy and can be used by one or more features at the next highest level of the hierarchy.

14. A method according to claim 13, wherein a first level of the hierarchy relates to applications operable on one or more of the plurality of electronic devices.

15. A method according to claim 14, wherein the applications include at least one of messaging, synchronization and file manager services.

16. A method of controlling at least one of a plurality of electronic devices, the method comprising:
- defining a plurality of features, which may be operable on one or more of the plurality of electronic devices;
- determining which of said plurality of features is operable on the at least one device;
- establishing interoperability of the determined features, by establishing which other features each of the determined features can use during operation of the at least one device; and
- controlling the at least one electronic device based on the determined features and the established interoperability, wherein the method is implemented by an object oriented programming language, and wherein each of the features is implemented as an object instance.

17. A method according to claim 16, wherein each object instance provides specific methods depending on types of service that the feature provides.

18. A method according to claim 16, wherein each object instance uses another object instance by invoking specific methods of that other object instance.

19. A method according to claim 16, wherein each feature is associated with a name based on a name format and wherein the feature is mapped to the object instance in the object oriented programming language via a mapping service using the name format.

* * * * *